Dec. 20, 1960  A. E. SMOLL  2,965,841
METHOD OF APPRAISAL OF FERRITE MATERIALS
Filed Nov. 12, 1957  2 Sheets-Sheet 1

INVENTOR.
ALLEN E. SMOLL
BY
Martin J. Finnegan
ATTORNEYS

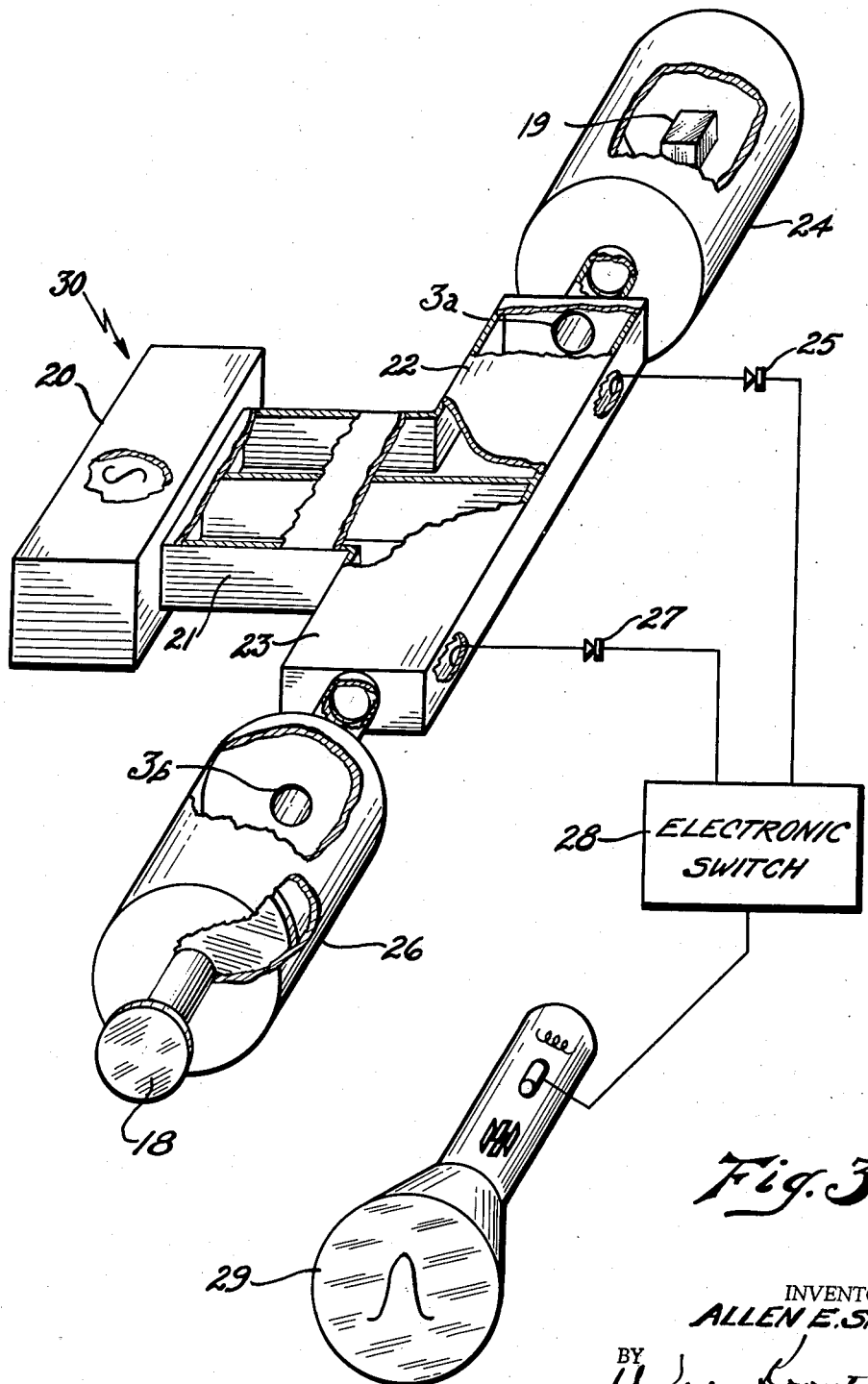

United States Patent Office 2,965,841
Patented Dec. 20, 1960

2,965,841

METHOD OF APPRAISAL OF FERRITE MATERIALS

Allen E. Smoll, Arlington, Mass., assignor to the United States of America as represented by the Secretary of the Air Force Filed Nov. 12, 1957, Ser. No. 695,996

2 Claims. (Cl. 324—58.5)

This invention relates to ferrite materials, and particularly to determination of the permeability tensor components thereof.

An object of the invention is to provide novel methods and means for measuring the magnetic properties of ferromagnetic materials, which methods and means are characterized by the application of microwave polarization principles in a manner to utilize such polarization behavior as a basis for comparison of two conditions, and thereby obtain a measure of the effect of introducing a ferromagnetic test sample into a region that is carrying such polarized microwave energy.

More specifically stated, an object of the invention is to provide novel methods and means for obtaining significant data on ferrite materials, which methods and means involve (a) utilization of a pair of resonant cavities, one having a standard or calibrated resonance response pattern, (b) introducing into the second cavity a ferrite test sample, (c) detecting, in separate operations, the frequency response of each cavity to each of two complementary modes of circular polarization of the wave energy resonating therein, and (d) comparing the results of such separate detection operations in terms of the coincidence, or lack of coincidence, in the respective output signals.

Figures 1, 1A:
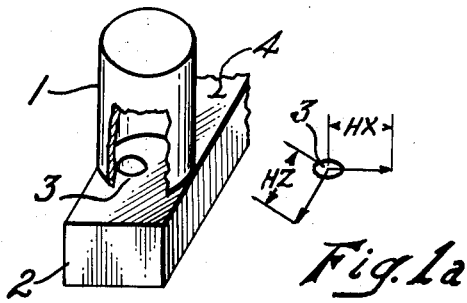
Figure 2:
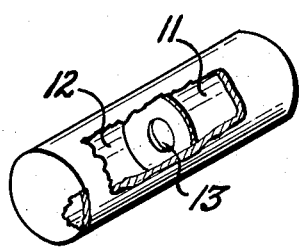
Figure 4:
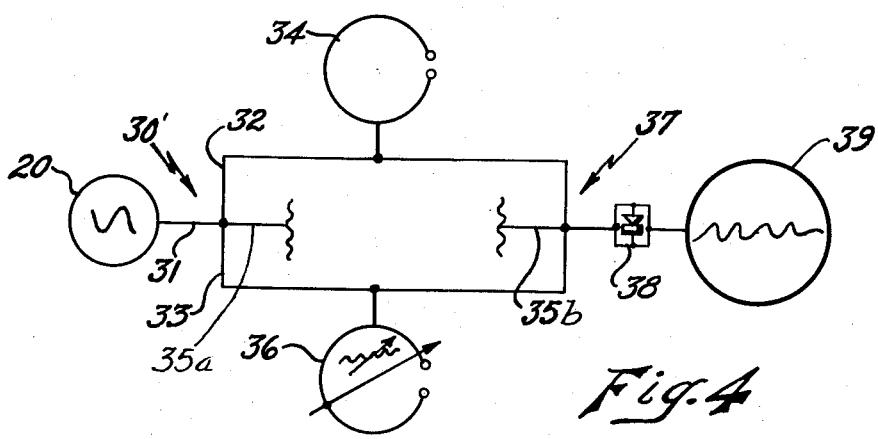
Figure 5:
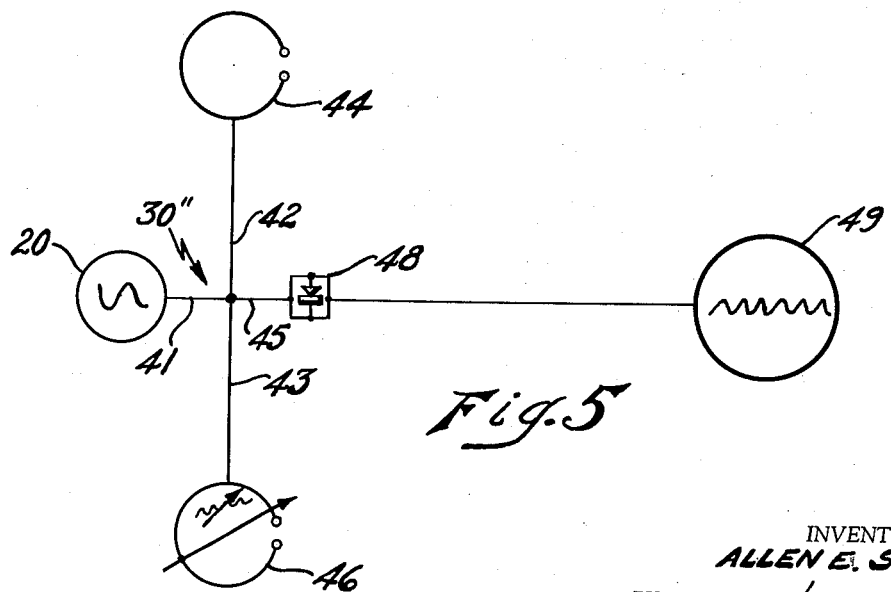

These and other objects and characteristics of the invention will be clarified by reference to the following detailed description of the invention as exemplified in the accompanying drawings wherein:

Figs. 1, 1a, and 2 graphically indicate how the wave polarizing principles utilized in the invention may be applied to wave guides of differing contours; and Figs. 3, 4 and 5 show complete circuitry for three species of the invention, each incorporating structures lending themselves to the desired polarizing sequences.

The invention is premised upon the known propensity of a $TE_{111}$ cavity carrying magnetized ferrite to exhibit a complex response pattern to the application of polarized wave energy thereto, the complexity of the pattern being due to the phase velocity inversion that accompanies circular polarization, according to whether the clockwise or counter-clockwise direction of polarization is being considered. Thus, where a $TE_{111}$ cavity is filled even partially with a magnetized ferrite material, it will exhibit two different resonant responses to the two circularly polarized modes. Heretofore, efforts have been made to calculate the permeability tensor by mathematically separating the "$n+k$" and "$n-k$" components that identify the right-hand and left-hand circularly polarized waves, respectively, in the over-all permeability tensor formulae, namely:

$$b_x = h_x(\mu + k + c) \quad (1)$$

and $$b_y = h_y(\mu - k + c) \quad (2)$$

wherein $b_x$ and $b_y$ refer to permeability along the $x$ and $y$ axes, respectively; $\mu+k$ and $\mu-k$ refer to the phase velocity in the right-hand and left-hand circular polarizing directions, respectively; $h_x$ and $h_y$ refer to the magnetic field intensity in the $x$ and $y$ directions, respectively, and $c$ is a constant additive inherent in the geometry of the particular wave guide structure utilized. These equations define the behavior when the static magnetic field is applied along the Z-axis in the normal, or positive, direction. When the field is applied in the negative Z direction the formulae reverse, as follows:

$$b_x = h_x(\mu - k + c) \quad (3)$$

and $$b_y = h_y(\mu + k + c) \quad (4)$$

In either situation, solution of the equations presents mathematical difficulties due to the fact that the two factors "$\mu+k$" and "$\mu-k$" are present concurrently, with each being affected by the other, so that separation thereof is a tedious mathematical exercise.

The present invention eliminates the mathematical tedium by adoption of a novel method of procedure which makes it possible to observe each of the said two factors "$\mu+k$" and "$\mu-k$" independently of the other—indeed, without the other factor being present. Specifically, this is accomplished by specially designing wave guide coupling apparatus so that one, and only one, circularly polarized wave pattern will be produced by application of the magnetic field. This single wave pattern, therefore, will exhibit only the "$\mu+k$" or the "$\mu-k$" characteristics of the cavity containing the ferrite to be analyzed; it will not exhibit any portion of the complementary ("$\mu-k$" or "$\mu+k$", as the case may be) factor. To obtain the data as to such complementary factor it is only necessary to reverse the direction of the applied magnetic field, as by accomplishing an end-to-end reversal of the position of the magnetized specimen 19 in relation to the cavity 24 illustrated in Fig. 3. Thus, each factor is derived in sequence, without modification in any degree by the other, since one factor is created as the sole derivative of operation in one physical direction (longitudinally of the wave guide) and the other factor is created as the sole derivative of operation in the reverse physical direction.

Means of inserting only one circularly polarized component is shown in Figs. 1 and 2. In Fig. 1 the coupling hole 3 is placed off the center line of broad face 4 of wave guide 2, at such a position that $H_x = H_z$ (see Fig. 1a). Because of their time quadrature relation, a circularly polarized mode is excited in the resonant cavity 1. In Fig. 2 a circularly polarized wave exists in the input circular wave guide 12 which couples into the cavity 11 through the coupling hole 13. Circularly polarized waves in guide 12 can be produced by means well known to the art. For example, see volume 9 of the series of reports of the MIT Radiation Laboratories, pp. 371–372.

The characteristics that need to be measured are the cavity Q and the resonant frequency of the cavity with and without ferrite. This may be done rapidly by comparing the measured cavity with a standard or calibrated cavity. Fig. 3 shows schematically how this may be arranged. A swept signal source 20 is connected to arm 21 of the magic tee 30. Equal power is fed into both arms 22 and 23. Cavity 24 contains a ferrite sample 19. Its frequency response is detected in the detector 25. The output is fed through an electronic switch 28 to the oscilloscope 29. The oscilloscope pattern is compared with the response pattern of the standard cavity 26 which can be adjusted in frequency and Q by conventional adjusting means 18 to match the response of the ferrite-filled cavity 24. When the two responses match, calibrations provided on the standard cavity 26 permit direct reading of resonant frequency and cavity Q.

A similar scheme is shown in Fig. 4. The swept signal power from source 20 is fed into arm 31 of the magic tee 30' and equal powers are fed into arms 32 and 33. Cavity 34 contains the material to be tested. Cavity 36 is the calibrated cavity. These two cavities have the same contours as cavities 24, 26 (Fig. 3) and connect to arms 32 and 33, respectively, by way of hollow conduits corresponding to those shown at "3a" and "3b," respectively, in Fig. 3. The side arms ("difference" arms) 35a and 35b correspond, in structure, to portions 22 and 23, respectively, of Figure 3. In this case, the outputs are compared in the difference arm 35b of magic tee 37. The output of the detector 38 is presented on the oscilloscope 39. The resonant frequency and the Q of cavity 36 coincide with those of cavity 34, a minimum output is shown on the oscilloscope 39.

A method based on comparing the reflected waves from the measured and calibrated cavities is shown on Fig. 5. Again the signal source 20 is fed into an arm 41 of the magic tee 30". The two cavities are connected to the side arms 42 and 43, in the same manner as is indicated at "3a" and "3b," respectively, in Fig. 3. The resonant frequency and Q of the resonant cavity 46 are adjusted so that a minimum output appears on arm 45, and is detected at 48, then presented on the oscilloscope 49. For this condition, the resonant frequency and the Q of cavity 44 are the same as for cavity 46 and can be read directly from the control knobs of cavity 46.

Wherever the term "ferromagnetic" is used herein, it is to be understood as embracing ferroelectric materials as well, to the extent permitted by the context. Likewise the term "magic tee" is to be understood as embracing other wave guide contours that lend themselves, in comparable fashion, to practice of the disclosed invention.

What is claimed is:

1. The method of appraising a test specimen of ferromagnetic material which comprises the steps of (a) coupling a resonant cavity containing the test specimen to a wave guide in such manner that application of a magnetic field along the Z-axis of the wave guide will produce a circularly polarized wave pattern in which the polarization is in a single circular direction only, (b) applying similar wave pattern energy to a reference cavity, and (c) comparing the outputs of the two cavities, in order to derive therefrom the particular permeability tensor factor that is peculiar to the particular circular direction of wave polarization that is produced by the applied magnetic field.

2. The method defined in claim 1, plus the further step of reversing the direction of field application by accomplishing an end-to-end reversal of the position of the test specimen in relation to the resonant cavity containing test specimen, to derive the complementary tensor factor.

References Cited in the file of this patent

UNITED STATES PATENTS

| | | |
|---|---|---|
| 2,580,968 | Sproull | Jan. 1, 1952 |
| 2,597,327 | Hollingsworth | May 20, 1952 |
| 2,810,882 | Walker | Oct. 22, 1957 |
| 2,817,813 | Rowen et al. | Dec. 24, 1957 |